US011433716B2

(12) United States Patent
Arakawa et al.

(10) Patent No.: US 11,433,716 B2
(45) Date of Patent: Sep. 6, 2022

(54) PNEUMATIC TIRE

(71) Applicant: TOYO TIRE CORPORATION, Itami (JP)

(72) Inventors: Koji Arakawa, Itami (JP); Yutaka Nakamoto, Itami (JP); Noriyuki Tsuji, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/241,328

(22) Filed: Apr. 27, 2021

(65) Prior Publication Data

US 2021/0339580 A1    Nov. 4, 2021

(30) Foreign Application Priority Data

Apr. 30, 2020  (JP) .............................. JP2020-080756
May 29, 2020  (JP) .............................. JP2020-094769
May 29, 2020  (JP) .............................. JP2020-094774
May 29, 2020  (JP) .............................. JP2020-094776

(51) Int. Cl.
  *B60C 15/024*   (2006.01)
  *B60C 15/06*    (2006.01)

(52) U.S. Cl.
  CPC ........ *B60C 15/024* (2013.01); *B60C 15/0242* (2013.01); *B60C 15/0603* (2013.01); *B60C 2015/061* (2013.01)

(58) Field of Classification Search
  CPC .......................... B60C 15/024; B60C 15/0242
  See application file for complete search history.

(56) References Cited

U.S. PATENT DOCUMENTS

| 6,367,526 B1 | 4/2002 | Hubbell, Jr. |
| 2004/0187995 A1 | 9/2004 | Yoshinaka |
| 2004/0238094 A1 | 12/2004 | Kajita |

(Continued)

FOREIGN PATENT DOCUMENTS

| DE | 10 2014 207 771 A1 | 10/2015 |
| EP | 2 949 483 A1 | 12/2015 |

(Continued)

OTHER PUBLICATIONS

Machine Translation: JP-2019112038-A, Satoi A, (Year: 2022).*
Machine Translation: JP-2007160983-A, Kobayashi Y, (Year: 2022).*
U.S. Appl. No. 17/241,259, filed Apr. 27, 2021.
U.S. Appl. No. 17/241,281, filed Apr. 27, 2021.
(Continued)

*Primary Examiner* — Kendra Ly
(74) *Attorney, Agent, or Firm* — WHDA, LLP

(57) ABSTRACT

A pneumatic tire includes a pair of bead portions that are arranged at intervals wider than a regular rim width in a non-rim-assembled state. The bead portion includes a rim protector, a bead base, a bead heel, and a bead back surface. In the non-rim-assembled state, the bead back surface is formed with a recess that is recessed inward in the tire width direction. The bead back surface has a second curved portion constituting a deepest portion of the recess and a third curved portion extending inward in the tire width direction from the rim protector. When a height of the deepest portion is H2, a height H8 of a virtual intersection of a curve obtained by extending the second curved portion and a curve obtained by extending the third curved portion is larger than 1.5 times H10 and smaller than 3.0 times H10.

8 Claims, 8 Drawing Sheets

(56) References Cited

U.S. PATENT DOCUMENTS

| | | | |
|---|---|---|---|
| 2010/0263779 A1 | | 10/2010 | Riegel et al. |
| 2015/0314654 A1* | | 11/2015 | Nagahara ............ B60C 15/0603 152/543 |
| 2021/0170806 A1 | | 6/2021 | Sasaya et al. |

FOREIGN PATENT DOCUMENTS

| | | | | |
|---|---|---|---|---|
| EP | 3 000 626 A1 | | 3/2016 | |
| JP | H04-252703 A | | 9/1992 | |
| JP | H05-77615 A | | 3/1993 | |
| JP | 2007-160983 A | | 6/2007 | |
| JP | 2007160983 A | * | 6/2007 | |
| JP | 2015-71337 A | | 4/2015 | |
| JP | 2015-212112 A | | 11/2015 | |
| JP | 2019112038 A | * | 7/2019 | |
| KR | 10-2014-0073332 A | | 6/2014 | |
| WO | 2019/107203 A1 | | 6/2019 | |

OTHER PUBLICATIONS

U.S. Appl. No. 17/241,295, filed Apr. 27, 2021.
U.S. Appl. No. 17/241,314, filed Apr. 27, 2021.
U.S. Appl. No. 17/241,347, filed Apr. 27, 2021.
Office Action dated May 9, 2022, issued in counterpart DE application No. 10 2021 110 586.2, with English translation (10 pages).
Office Action dated May 11, 2022, issued in DE application No. 10 2021 110 594.3 (counterpart to U.S. Appl. No. 17/241,347), with English translation. (12 pages).
Non-Final Office Action dated Jun. 23, 2022, issued in U.S. Appl. No. 17/241,259. (12 pages).
Non-Final Office Action dated Jul. 1, 2022, issued in U.S. Appl. No. 17/241,347. (14 pages).
Non-Final Office Action dated Jun. 23, 2022, issued in U.S. Appl. No. 17/241,281. (10 pages).
Non-Final Office Action dated Jun. 24, 2022, issued in U.S. Appl. No. 17/241,295. (12 pages).
Non-Final Office Action dated Jun. 24, 2022, issued in U.S. Appl. No. 17/241,314. (15 pages).

* cited by examiner

PNEUMATIC TIRE

CROSS-REFERENCE TO RELATED APPLICATIONS

This application claims priority of Japanese Patent Application No.: 2020-080756 filed on Apr. 30, 2020, Japanese Patent Application No.: 2020-094769 filed on May 29, 2020, Japan Patent Application No.: 2020-094774 filed on May 29, 2020 and Japanese Patent Application No.: 2020-094776 filed on May 29, 2020, the content of which are incorporated herein by reference.

BACKGROUND OF THE INVENTION

Technical Field

The present invention relates to a pneumatic tire.

Related Art

A pneumatic tire including a tread, a pair of sidewalls extending from both sides in a width direction of the tread to an inner diameter side, and a pair of bead portions continuous with respective inner diameter sides of these, in which the pair of the bead portions are formed to have a width therebetween wider than a normal rim width in a non-rim-assembled state, is known. Further, in the non-rim-assembled state, the outer surface on an outer side in the tire width direction of the bead portion extends in a direction inclined outward in the tire width direction toward the outer side in the tire radial direction.

In a case where this pneumatic tire is assembled to a corresponding regular rim, it is necessary to bring the pair of the bead portions close so that the width thereof equals a regular rim width. Furthermore, in particular, since the pneumatic tire has a portion which is inclined outward in the tire width direction from the bead portion toward the sidewall, the bead portion tends to be inclined outward in the tire width direction toward the outer side in the tire radial direction in a rim-assembled state.

As a result, as shown in FIG. 8, a bead portion 130 tends to abut to a regular rim 50 on two points including a rim seat 51 and a rim flange 53, and a gap S is generated between the bead portion 130 and the rim flange 53. In particular, the bead portion 130 tends to strongly abut on the rim flange 53 locally on an outer surface in the width direction due to inclination of the outer surface in the width direction. The gap S is a space between the bead portion 130 and the rim flange 53. In other words, the gap S is a space enclosed by the bead portion 130 and the rim flange 53.

Further, Japanese Patent Application Laid-Open No. 2015-212112 discloses a pneumatic tire which is formed with a recess that is recessed inward in the tire width direction, on a bead back surface. In the rim-assembled state, this pneumatic tire strongly abuts locally on the rim flange at two points including a portion on the outer side in the tire radial direction of a recess and a portion on the inner side in the tire radial direction of the recess. In this manner, it is intended to strengthen the fixing of the bead portion to the rim flange to improve steering stability.

SUMMARY

According to the pneumatic tire, the bead back surface strongly abuts locally on the rim flange in the rim-assembled state, and thus abutting portions are strongly compressed. For example, when a load acts in the tire radial direction and/or in the tire width direction during turning, the abutting portions have already strongly compressed and are less likely to be compressed further. Therefore, on the sidewall, a portion close to the bead portion is hardly deformed, and the deformation is likely to be biased to a portion close to the tread. That is, the load supportability on the sidewall is not efficient, and the steering stability is less likely to be improved.

An object of the present invention is to provide a pneumatic tire capable of improving the steering stability by improvement in the efficiency of the load supportability on a sidewall.

According to the present invention, there is provided a pneumatic tire including:

a tread;

a pair of sidewalls extending inward in a tire radial direction from both ends in a tire width direction of the tread; and a pair of bead portions that are continuous to the inner side in the tire radial direction of the pair of sidewalls and arranged at intervals wider than a regular rim width in a non-rim-assembled state.

The bead portion includes a rim protector that projects outward in the tire width direction, a bead base that extends in the tire width direction at an inner end in the tire radial direction, a bead heel that curves outward in the tire radial direction toward the outer side in the tire width direction from an outer end in the tire width direction of the bead base, and further curves inward in the tire width direction toward the outer side in the tire radial direction, and a bead back surface extending outward in the tire radial direction from an outer end in the tire radial direction of the bead heel and continuous with the rim protector, in the non-rim-assembled state, the bead back surface is formed with a recess that is recessed inward in the tire width direction than the outer end in the tire width direction of the bead heel, the bead back surface includes a recess R portion that has a center of curvature on the outer side in the tire width direction and at least a part constituting a deepest portion of the recess, and an outer diameter side R portion that curves inward in the tire radial direction toward the inner side in the tire width direction from a top of the rim protector, and when a tire radial height with reference to a nominal rim diameter of a corresponding regular rim of the deepest portion is H10, a tire radial height H8 with reference to the nominal rim diameter of a virtual intersection of a curve obtained by extending the recess R portion outward in the tire radial direction and a curve obtained by extending the outer diameter side R portion inward in the tire width direction is larger than 1.5 times H10 and smaller than 3.0 times H10.

According to the present invention, since the recess is formed on the bead back surface, an inner diameter side portion located on the inner diameter side from the deepest portion of the recess of the bead back surface is inclined outward in the tire width direction toward the inner side in the tire radial direction in the non-rim-assembled state. In the rim-assembled state in which a pair of the bead portions are brought closer so that the width thereof equals the rim width of the regular rim, the inner diameter side portion is bent inward in the tire width direction from an area around the deepest portion of the recess as a bending starting point, and is likely to be arranged approximately along the tire radial direction. That is, in the rim-assembled state, the bead back surface can be easily brought into close contact with substantially the entire surface of the radial portion of the rim flange while the recess is disappeared, and the contact area can be expanded.

In this way, in the no-load state where the pneumatic tire is assembled on the rim, the surface pressure acts on substantially the entire surface of the bead back surface that is in close contact with the radial portion of the rim flange. Accordingly, as compared with the case where the surface pressure acts only on a part of the bead back surface, a load is entirely distributed on the bead back surface. That is, a sufficient compression margin for elastic deformation of the bead back surface can be provided as compared with the case where a high surface pressure acts locally on the bead back surface.

Therefore, the bead back surface can be further compressed as much as the sufficient compression margin at the time of radial load input and lateral force input. In this case, in the sidewall, a portion close to the bead portion may also be deformed as the bead back surface is further compressed. Accordingly, the sidewall may be deformed so as to be totally bent from the bead portion side to the tread side. Therefore, the load supportability on the sidewall is made more efficient, and thus the steering stability is improved.

In particular, since the tire radial height H8 of the virtual intersection is larger than 1.5 times and smaller than 3.0 times the tire radial height H10 of the deepest portion, it is easy to constitute the recess R portion to be large on the outer side in the tire radial direction. In this manner, the recess portion can be easily configured to be large in the tire radial direction, and in the rim-assembled state, an inner diameter side portion located on the inner diameter side from the deepest portion of the recess can be more easily brought into contact with substantially the entire surface of the radial portion of the rim flange.

The recess may have a depth of less than 1.0 mm in the tire width direction.

According to the present configuration, the inner diameter side portion, which is appropriately inclined outward in the tire width direction in the non-rim-assembled state, is bent inward in the tire width direction in the rim-assembled state so that the inclination outward in the tire width direction is easily eliminated, and is just easily arranged along the radial portion of the rim flange. If the depth of the recess is 1.0 mm or more, the inner diameter side portion is likely to be excessively inclined outward in the tire width direction in the non-rim-assembled state, and, even if bent inward in the tire width direction in the rim-assembled state, the inclination outward in the tire width direction is unlikely to be eliminated. In this case, in the rim-assembled state, the recess is unlikely to disappear, and thus the bead back surface is unlikely to abut on substantially the entire radial portion of the rim flange.

A tangent line with respect to the recess R portion extending from the virtual intersection and a tangent line with respect to the outer diameter side R portion extending from the virtual intersection may intersect so as to project in a direction inclined outward in the tire radial direction toward the inner side in the tire width direction.

According to the present configuration, at the virtual intersection, as compared with a case where the tangent line with respect to the recess R portion and the tangent line with respect to the outer diameter side R portion intersect so as to project in a direction inclined inward in the tire radial direction toward the outer side in the tire width direction, it is easy to configure the recess R portion to be large in the tire radial direction.

When a tire radial height with reference to the nominal rim diameter of the top of the rim protector is H6, a tire radial height H8 of the virtual intersection may be larger than 0.7 times H6 and smaller than 1 time H6.

Generally, the top of the rim protector is located in a manner corresponding to the outer diameter side of the outer diameter side end of the rim flange. Therefore, if the tire radial height H8 of the virtual intersection is larger than 0.7 times and smaller than 1 time the tire radial height H6 of the rim protector, the virtual intersection can be easily set in a manner sufficiently separated outward in the tire radial direction with respect to the radial portion of the rim flange. In this manner, the recess R portion can be easily configured to be large in the tire radial direction.

If the tire radial height H8 of the virtual intersection is 0.7 times or less H6, it is difficult to set the virtual intersection to be sufficiently separated outward in the tire radial direction with respect to the curved portion of the rim flange, and it is difficult to configure the recess R portion to be large in the tire radial direction. Further, if the tire radial height H8 of the virtual intersection is 1 time or more H6, the outer diameter side R portion extends in a direction inclined outward in the tire radial direction toward the inner side in the tire width direction. Therefore, thickness of the rim protector tends to be insufficient, and the protection performance of the rim flange by the rim protector deteriorates.

Over the recess R portion and the outer diameter side R portion, a connection R portion that connects them in a tangential continuous manner may be formed, and when a radius of curvature of the recess R portion is R2, a radius of curvature of the outer diameter side R portion is R3, and a radius of curvature of the connection R portion is R4, the radii R2, R3, and R4 of curvature may satisfy R4<R2≤R3.

The radius R3 of curvature may be 1.2 times or more the radius R2 of curvature.

According to the present configuration, while preventing the inner end in the tire width direction of the outer diameter side R portion from being configured inward in the tire radial direction, the connection R portion is configured to be small. Accordingly, the recess R portion can be easily configured to be large in the tire radial direction.

The bead portion may further include an annular bead core arranged in an end on the inner side in the tire radial direction, and an annular bead filler that is connected to an outer peripheral surface of the bead core and has a cross-sectional shape in a meridian direction narrowing toward the outer side in the tire radial direction, and with reference to the nominal rim diameter, a height of a tip of the bead filler may be 1.1 times or more the tire radial height of the virtual intersection.

More preferably, with reference to the nominal rim diameter, the height of the tip of the bead filler may be 1.3 times or more the tire radial height of the virtual intersection.

According to the present configuration, with reference to the nominal rim diameter, the tip of the bead filler is located at a tire radial position that is 1.1 times the height of the virtual intersection. In other words, the bead filler, which is a rigid member, is located in a manner corresponding to a tire radial position of a portion where the virtual intersection is located between the recess R portion and the outer diameter side R portion and that is likely to be a starting point of bending. As a result, bending deformation between the recess R portion and the outer diameter side R portion is suppressed, and the durability around the bead portion is improved.

In particular, when the height of the tip of the bead filler is 1.3 times or more the tire radial height of the virtual intersection, the virtual intersection is located so as to sufficiently avoid the tip, which tends to have low rigidity, of the bead filler. That is, since a portion having higher rigidity of the bead filler is located in a manner corresponding to the virtual intersection, the durability around the bead portion is further improved.

According to the present invention, it is possible to improve the steering stability by improving the efficiency of the load supportability on the sidewall.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments according to the present invention will be described with reference to the accompanying drawings. It should be noted that description below is merely exemplary in nature and is not intended to limit the invention, its application, or its use. Further, the drawings are schematic, and ratios of dimensions and the like are different from actual ones.

Figure 1:
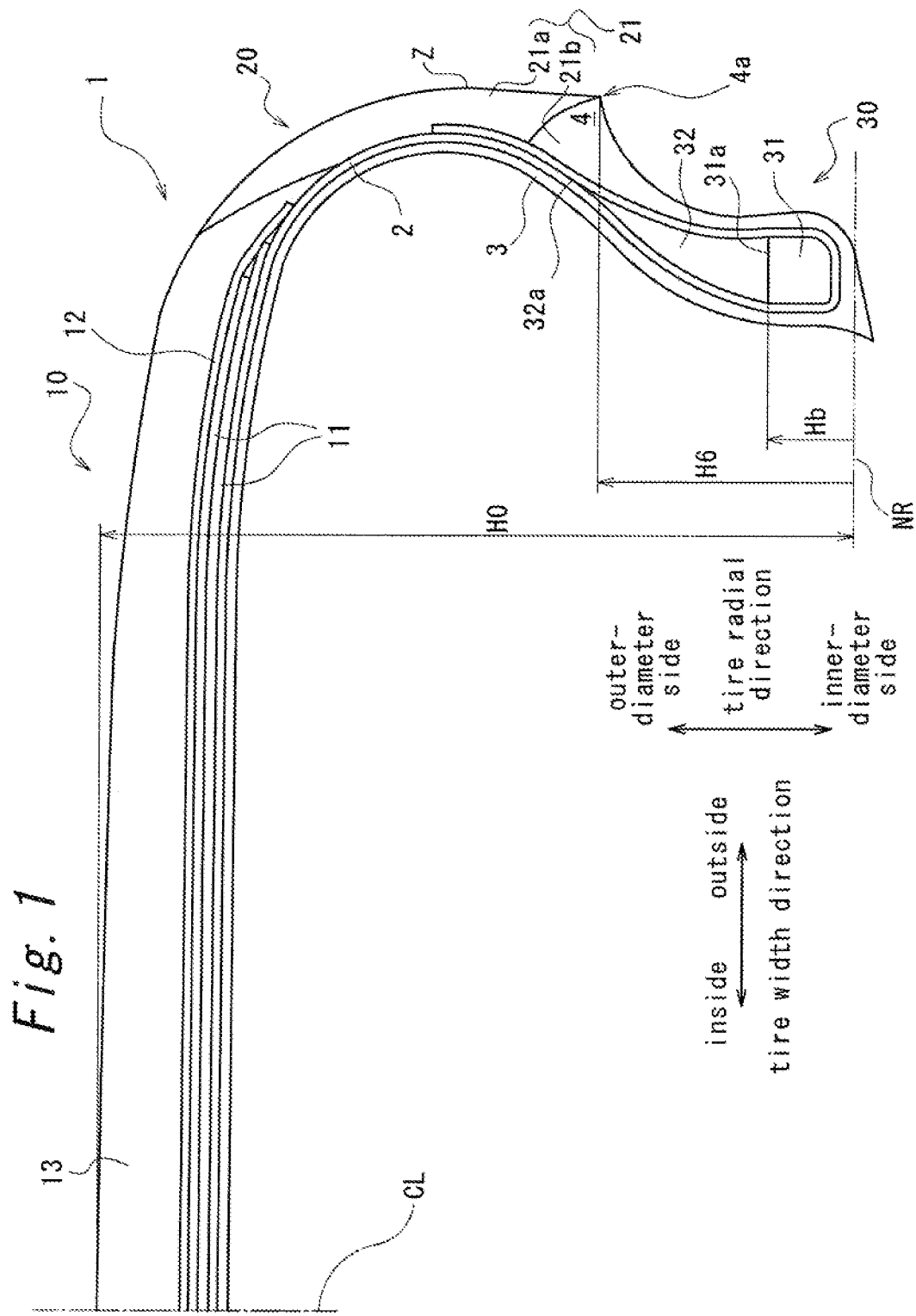
FIG. 1 is a meridian cross-sectional view of a pneumatic tire according to an embodiment of the present invention.

FIG. 1 is a cross-sectional view in the meridian direction of a pneumatic tire 1 according to an embodiment of the present invention, and shows only one side with respect to a tire equator line CL. The pneumatic tire 1 includes a tread 10, a pair of sidewalls 20 extending inward in a tire radial direction from both ends in a tire width direction of the tread 10, and a pair of bead portions 30 continuous with the inner side in the tire radial direction of the pair of the sidewalls 20.

A bead core 31 and a bead filler 32 connected to the outer side in the tire radial direction of the bead core 31 are embedded in the bead portion 30. The bead core 31 is configured by an annular bundle body, which is formed of a bead wire made from a steel wire in a plurality of turns, coated with rubber. A cross-sectional shape of the bead core 31 is formed in a polygonal shape so as to have a bead core outer end surface 31a extending in the tire width direction in an end on the outer side in the tire radial direction. A height Hb in the tire radial direction based on the nominal rim diameter (specified by JIS4102) NR (also referred to as the reference rim diameter) of the bead core outer end surface 31a is 6.7 mm in the present embodiment.

The bead filler 32 is made from hard rubber extending in an annular shape along the bead core outer end surface 31a, and is formed in a triangular shape having a cross-sectional shape in the meridian direction which narrows in the tire width direction toward the outer side in the tire radial direction.

A carcass ply 2 is laid over the tread 10 and the sidewall 20 between a pair of bead cores 31. The carcass ply 2 is folded back from the tire inner surface side to the tire outer surface side around the bead core 31. An inner liner 3 for maintaining air pressure is provided on the tire inner surface side of the carcass ply 2.

In the tread 10, a belt layer 11 and a belt reinforcing layer 12 are laminated in this order on the outer side in the tire radial direction of the carcass ply 2. In the present embodiment, the belt layer 11 is composed of two layers. Tread rubber 13 is laminated on the outer side in the tire radial direction of the belt reinforcing layer 12. The tread rubber 13 constitutes the outer surface in the tire radial direction of the pneumatic tire 1.

Tire side rubber 21 is arranged over the sidewall 20 and the bead portion 30 on the outer side in the tire width direction of the carcass ply 2. The tire side rubber 21 includes sidewall rubber 21a extending inward in the tire radial direction from an end in the tire width direction of the tread rubber 13 and a rim strip rubber 21b that is connected to the inner diameter side end and further extends inward in the tire radial direction. The tire side rubber 21 constitutes the outer surface in the tire width direction of the pneumatic tire 1.

The sidewall rubber 21a constitutes a large part of the sidewall 20. The rim strip rubber 21b is provided in a manner at least corresponding to a portion that abuts on the rim flange 53 of the tire side rubber 21 in a state where the tire is assembled on a corresponding regular rim 50 (see FIG. 2) (referred to as the rim-assembled state). As the rim strip rubber 21b, rubber having excellent wear resistance as compared with the sidewall rubber 21a is employed.

The tire side rubber 21 is formed with a rim protector 4 that projects outward in the tire width direction. The rim protector 4 is located on the inner side in the tire radial direction than a tire maximum width position Z. The maximum width position Z is a position where a profile line on the outer surface of the sidewall 20 is farthest in the tire width direction from the tire equator line CL. That is, the thickness of the tire side rubber 21 gradually increases from the maximum width position Z toward the rim protector 4, and gradually decreases from the rim protector 4 toward the inner side in the tire radial direction.

The rim protector 4 is bent inward in the tire width direction at an end which extends inward in the tire radial direction from the maximum width position Z, and has a top 4a that is thickest. The top 4a is located at a height of H6 outward in the tire radial direction from the nominal rim diameter NR. The height H6 of the top 4a is located on the outer side in the tire radial direction than the rim flange 53 of the corresponding regular rim 50 in the rim-assembled state.

Note that, in the present description, a portion located on the outer diameter side than a tip 32a of the bead filler 32 in the tire radial direction is referred to as the sidewall 20, and a portion located on the inner diameter side is referred to as the bead portion 30. The rim protector 4 is located in the bead portion 30. Further, in the present description, the thickness of the tire side rubber 21 is defined as being in a direction perpendicular to the outer surface of the carcass ply 2.

Figure 2:
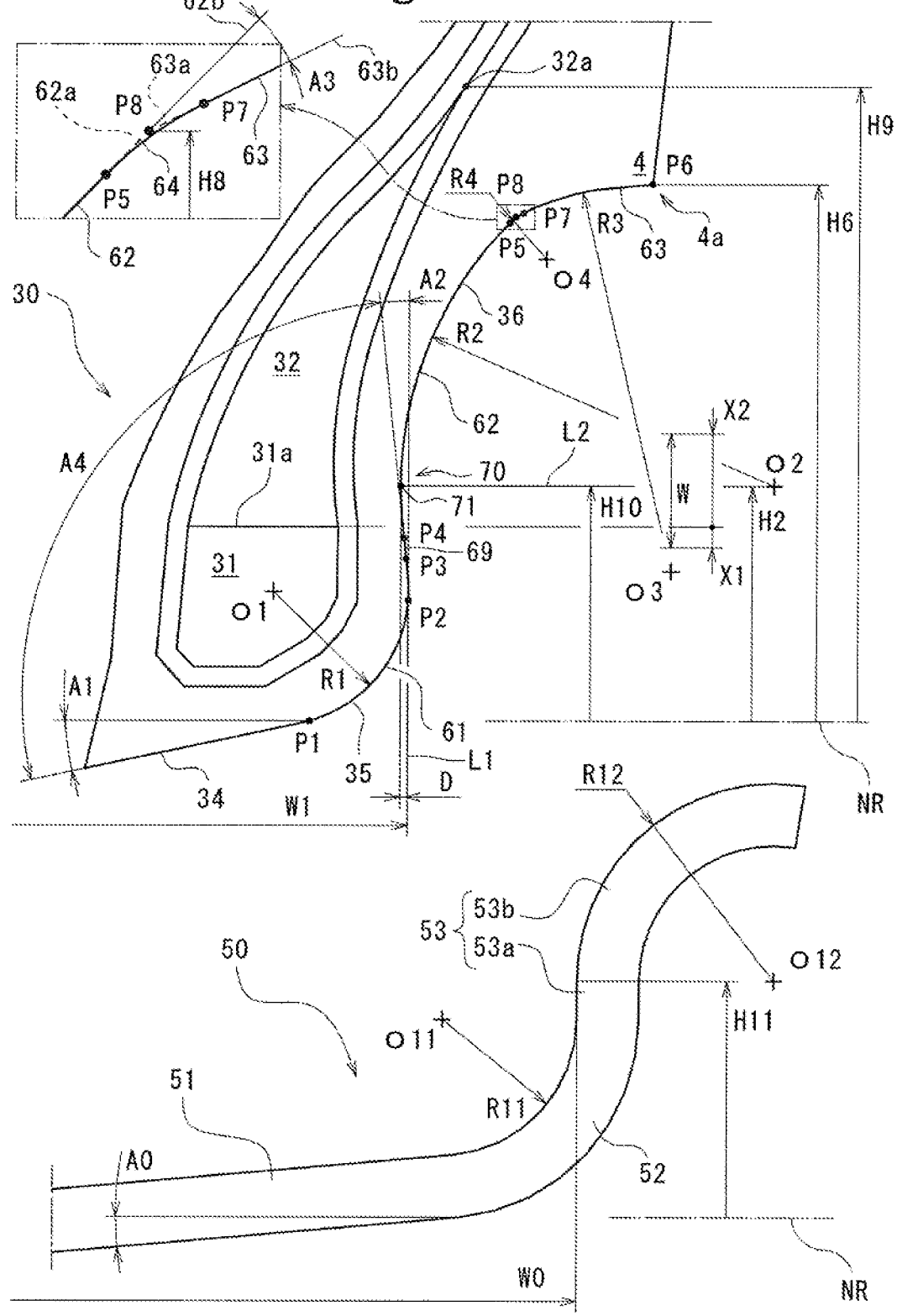
FIG. 2 is a meridian cross-sectional view of an area around a bead portion of the pneumatic tire before rim assembly.

FIG. 2 illustrates an enlarged view of an area around the bead portion 30 in a state where the tire is not assembled with the regular rim 50 (referred to as the non-rim-assembled state), and also illustrates an area around the rim flange 53 of the corresponding regular rim 50. The regular rim 50 includes a rim seat 51 extending outward in the tire width direction, a rim heel 52 curved in an arc shape outward in the tire radial direction from an outer end in the tire width direction of the rim seat 51, and a rim flange 53 extending outward in the tire radial direction from an outer end in the tire radial portion of the rim heel 52.

The rim seat 51 is inclined inward in the tire radial direction toward the inner side in the tire width direction, and an inclination angle with respect to a straight line parallel to the tire axis is A0. The rim flange 53 has a flange radial portion 53a extending outward in the tire radial direction parallel to the tire radial direction from the rim heel 52, and a flange curved portion 53b curved in an arc shape outward in the tire width direction in a manner continuous with an outer end in the tire radial direction of the flange radial portion 53a.

The rim heel 52 has the outer surface where the pneumatic tire 1 is fitted, which extends in an arc shape having a radius R11 of curvature about a center O11 of curvature located closer to inside of the pneumatic tire 1 than the outer surface. A pair of the flange radial portions 53a are arranged apart from each other by a rim width W0 in the tire width direction. The flange radial portion 53a extends to a height of H11 outward in the tire radial direction from the nominal rim diameter NR. The flange curved portion 53b extends in an arc shape having a radius of curvature of R12 about a center O12 of curvature located in the tire outer side than inside of the pneumatic tire 1.

Note that regular rim 50 is a rim that is defined for each tire in the standard system including the standard on which the tire is based. For example, "standard rim" is used in JATMA, and "Measuring Rim" is used in TRA and ETRTO.

The regular rim 50 according to the present embodiment conforms to the flange symbol J of the 5 degree drop center rim specified in JATMA, the inclination angle A0 of the rim seat 51 is 5°, the radius R11 of curvature of the rim heel 52 is 6.5 mm, the height H11 of the flange radial portion 53a is 8 mm, and the radius R12 of curvature of the flange curved portion 53b is 9.5 mm. Further, the angle between the rim seat 51 and the radial portion 53a of the regular rim 50 according to the present embodiment is 95°.

The bead portion 30 includes a bead base 34 extending in the tire width direction at an inner end in the tire radial direction, a bead heel 35 curved outward in the tire radial direction from an outer end in the tire width direction of the bead base 34 toward the outer side in the tire width direction, and a bead back surface 36 extending outward in the tire radial direction from an outer end in the tire radial direction of the bead heel 35 and continuous with the rim protector 4.

The bead base 34 is linearly inclined inward in the tire radial direction toward the inner side in the tire width direction in the non-rim-assembled state, and an inclination angle with respect to a straight line parallel to the tire axis is A1. That is, the bead base 34 is composed of a single straight segment. Specifically, the inclination angle A1 is larger than the inclination angle A0 of the rim seat 51. Preferably, the difference between the inclination angle A1 and the inclination angle A0 is 8° or less. In the present embodiment, the inclination angle A1 is 12°, which is 7° larger than the inclination angle A0. The bead base 34 may have a plurality of base surfaces that are gradually inclined inward in the tire radial direction toward the inner side in the tire width direction. In this case, the inclination angle with respect to a straight line parallel to the tire axis of the base surface located on the outermost side in the tire width direction (that is, continuous with the bead heel 35) among a plurality of the base surfaces is defined as the inclination angle A1 according to the present embodiment.

The bead heel 35 is located in a manner corresponding to the inner side in the tire radial direction and the outer side in the tire width direction with respect to the bead core 31. The outer surface of the bead heel 35 is composed of a first curved portion 61 (heel R portion). The first curved portion 61 curves outward in the tire radial direction toward the outer side in the tire width direction and extends from a first point P1 located at the outer end in the tire width direction of the bead base 34, and, in the non-rim-assembled state, reaches a second point P2 located on the outermost side in the tire width direction of an inner portion in the tire radial direction of the bead portion 30, and also curves inward in the tire width direction toward the outer side in the tire radial direction from the second point P2 and further extends to reach a third point P3.

The first curved portion 61 is composed of an arc-shaped portion having a radius R1 of curvature about a center O1 of curvature located closer to the tire inner side than the outer surface of the bead portion 30. The center O1 of curvature and the radius R1 of curvature are set to be substantially the same as the center O11 of curvature and the radius R11 of curvature of the rim heel 52, respectively. In the present embodiment, since the radius R11 of curvature of the rim heel 52 is 6.5 mm, the radius R1 of curvature of the first curved portion 61 is set to 5.5 mm or more and 7.5 mm or less.

The bead back surface 36 includes, on the outer surface, at least a second curved portion 62 (recess R portion) that is located on the inner side in the tire radial direction and constitutes at least a part of a recess 70 described later, and a third curved portion 63 (outer diameter side R portion) that is located on the outer side in the tire radial direction and reaches the top 4a of the rim protector 4. It should be noted that the letter "R" of the term "R portion" in this specification does not have a special meaning.

The second curved portion 62 extends in a direction inclined inward in the tire width direction toward the outer side in the tire radial direction from a fourth point P4 located on the outer side in the tire radial direction and on the inner side in the tire width direction than the third point P3, and curves outward in the width direction to reach a fifth point P5. The fifth point P5 is located on the outer side in the tire width direction than the second point P2. The second curved portion 62 is composed of an arc-shaped portion having a radius R2 of curvature about a center O2 of curvature located closer to the tire outer side than the outer surface of the bead portion 30.

A height H2 in the tire radial direction of the center O2 of curvature based on the nominal rim diameter NR is equal to or more than the height H11 of the flange radial portion 53a of the corresponding regular rim 50. Further, preferably, the height H2 of the center O2 of curvature is 1.5 times or less the height H11 of the flange radial portion 53a. In the present embodiment, since the height H11 of the flange radial portion 53a is 8 mm, the height H2 of the center O2 of curvature is set to 8 mm or more and 12 mm or less. Further, preferably, the height H2 in the tire radial direction of the center O2 of curvature based on the nominal rim diameter NR is 0.2 time or more and 0.6 time or less the height H6 in the tire radial direction of the top 4a of the rim protector 4 based on the nominal rim diameter NR.

Further, the center O2 of curvature is located in a radial range W between a radial position X1 that is 2 mm inward in the tire radial direction and a radial position X2 that is 9 mm outward in the tire radial direction with reference to the bead core outer end surface 31a in the tire radial direction.

Furthermore, the height H2 of the center O2 of curvature is set to be less than 0.25 time a tire cross-sectional height H0 (see FIG. 1). The tire cross-sectional height H0 is calculated as a value that is the outer diameter of the pneumatic tire 1 minus the nominal rim diameter divided by two.

The radius R2 of curvature is larger than the radius R12 of curvature of the flange curved portion 53b of the corresponding regular rim 50. Preferably, the radius R2 of curvature is 1.4 times or more the radius R12 of curvature, and more preferably 1.6 times or more and 2.4 times or less the radius R12 of curvature. In the present embodiment, since the radius R12 of curvature of the flange curved portion 53b is 9.5 mm, the radius R2 of curvature is set to 14 mm or more, more preferably 16 mm or more and 22 mm or less.

Further, the radius R2 of curvature is set to 1.0 time or more and 4.5 times or less the radius R1 of curvature of the first curved portion 61.

The third curved portion 63 extends by curving inward in the tire radial direction toward the inner side in the tire width direction from a sixth point P6 located in the top 4a of the rim protector 4, and reaches a seventh point P7. The third curved portion 63 is composed of an arc-shaped portion having a radius R3 of curvature about a center O3 of curvature located closer to the tire outer side than the outer surface of the bead portion 30. The radius R3 of curvature is set to a radius equal to or more than the radius R2 of curvature of the second curved portion 62. Preferably, the radius R3 of curvature is 1.2 times or more the radius R2 of curvature.

As shown in the enlarged view of FIG. 2, a virtual curve 62a obtained by extending the second curved portion 62 outward in the tire radial direction and a virtual curve 63a obtained by extending the third curved portion 63 inward in the tire width direction intersect so as to project to the tire inner side at a virtual intersection P8.

A height H8 in the tire radial direction of the virtual intersection P8 based on the nominal rim diameter NR is more than 1.5 times and less than 3.0 times the height H2 of the center O2 of curvature of the second curved portion 62. More preferably, the height H8 of the virtual intersection P8 is more than 2 times and less than 2.5 times the height H2 of the center O2 of curvature. Further, the height H8 of the virtual intersection P8 is 0.7 time or more the height H6 of the top 4a of the rim protector 4. The height H8 of the virtual intersection P8 is, for example, 15 mm or more and 25 mm or less, preferably 20 mm or more and 24 mm or less.

Further, the height H8 of the virtual intersection P8 is smaller than a height H9 of the tip 32a of the bead filler 32 based on the nominal rim diameter NR. Specifically, the height H9 of the tip 32a of the bead filler 32 is preferably 1.1 times or more, more preferably 1.3 times or more, the height H8 of the virtual intersection P8.

An intersection angle A3 between the virtual curve 62a and the virtual curve 63a, that is, an angle between a tangent line 62b with respect to the second curved portion 62 (virtual curve 62a) extending from the virtual intersection P8 and a tangent line 63b with respect to the third curved portion 63 (virtual curve 63a) extending from the virtual intersection P8 is more than 0° and less than or equal to 45°. When the intersection angle A3 exceeds 45°, strain tends to concentrate between the second curved portion 62 and the third curved portion 63, and thus the bead durability tends to deteriorate. Preferably, the intersection angle A3 is 30° or less. The intersection angle A3 is defined as an angle between the tangent line 62b and the tangent line 63b extending outward in the tire width direction from the virtual intersection P8.

Further, the bead back surface 36 has a straight segment 69 that linearly connects the third point P3 and the fourth point P4 and a fourth curved portion 64 (connection R portion) that connects the fifth point P5 and the seventh point P7 in an arc shape.

The straight segment 69 connects the first curved portion 61 and the second curved portion 62 in a tangential continuous manner. In other words, the third point P3 constitutes a tangent point with respect to the straight segment 69 in the first curved portion 61, and the fourth point P4 constitutes a tangent point with respect to the straight segment 69 in the second curved portion 62. The straight segment 69 is inclined inward in the tire width direction toward the outer side in the tire radial direction, and an inclination angle with respect to a straight line parallel to the tire radial direction is A2. The inclination angle A2 is set to be smaller than the inclination angle A1 of the bead base 34. In the present embodiment, the inclination angle A2 is 10° or less. Furthermore, the inclination angle A2 is set so that an angle A4 between the straight segment 69 and the bead base 34 is 95° or more and 105° or less. Further, the inclination angle A2 is set to be smaller than a value obtained by subtracting the inclination angle A0 of the seat portion 51 of the rim from the inclination angle A1 of the bead base 34 (A2<A1−A0).

The fourth curved portion 64 connects the second curved portion 62 and the third curved portion 63 in a tangential continuous manner, and is composed of an arc-shaped portion having a radius R4 of curvature about a center O4 of curvature located in the tire outer side with respect to the bead portion 30. In other words, the fifth point P5 constitutes a tangent point with respect to the fourth curved portion 64 in the second curved portion 62, and the seventh point P7 constitutes a tangent point with respect to the fourth curved portion 64 in the third curved portion 63.

The radius R4 of curvature of the fourth curved portion 64 is smaller than the radii R2 and R3 of curvature of the second curved portion 62 and the third curved portion 63.

Here, in the non-rim-assembled state, the bead portion 30 is formed at an inner side portion in the tire radial direction over the bead heel 35 and the bead back surface 36 with the recess 70 recessed inward in the tire width direction. The recess 70 means a portion located on the inner side in the tire width direction with respect to a radial straight line L1 extending in a direction parallel to the tire radial direction through the second point P2 of the bead heel 35 and the bead back surface 36. That is, the recess 70 is composed of a portion located between the second point P2 and the third point P3 of the first curved portion 61, the straight segment 69, and a portion located on the inner side in the tire radial direction of the second curved portion 62.

The recess 70 has a deepest portion 71 that is most deeply recessed inward in the tire width direction. The deepest portion 71 is located on the second curved portion 62. The deepest portion 71 is located on the outer side in the radial direction than the straight segment 69. In other words, the straight segment 69 is provided on the inner side in the tire radial direction than the deepest portion 71. A depth D of the deepest portion 71 is set to less than 1.0 mm, preferably 0.8 mm or less, and more preferably 0.3 mm or more and 0.5 mm or less with respect to the radial straight line L1.

A height H10 of the deepest portion 71 based on the nominal rim diameter NR is equal to or higher than the height H11 of the flange radial portion 53a of the corresponding regular rim 50. Further, preferably, the height H10 of the deepest portion 71 is 1.5 times or less the height H11 of the flange radial portion 53a. In the present embodiment, since the height H11 of the flange radial portion 53a is 8 mm, the height H11 of the deepest portion 71 is set to 8 mm or more and 12 mm or less.

Note that, in the present embodiment, the deepest portion 71 is located on a width direction straight line L2 extending in a direction parallel to the tire width direction from the center O2 of curvature of the second curved portion 62 extending in an arc shape. Accordingly, the height H10 of the deepest portion 71 is equal to the height H2 of the center O2 of curvature of the second curved portion 62.

Here, in the pneumatic tire 1, a pair of the bead portions 30 are arranged at intervals wider than the rim width W0 in the non-rim-assembled state. Specifically, an outer width W1 (that is, a distance between the second points P2) in the tire width direction between a pair of the bead heels 35 is larger than the rim width W0. For example, the difference between the outer width W1 and the rim width W0 is 1.5 inches or less, preferably 1 inch or less.

Figure 3:
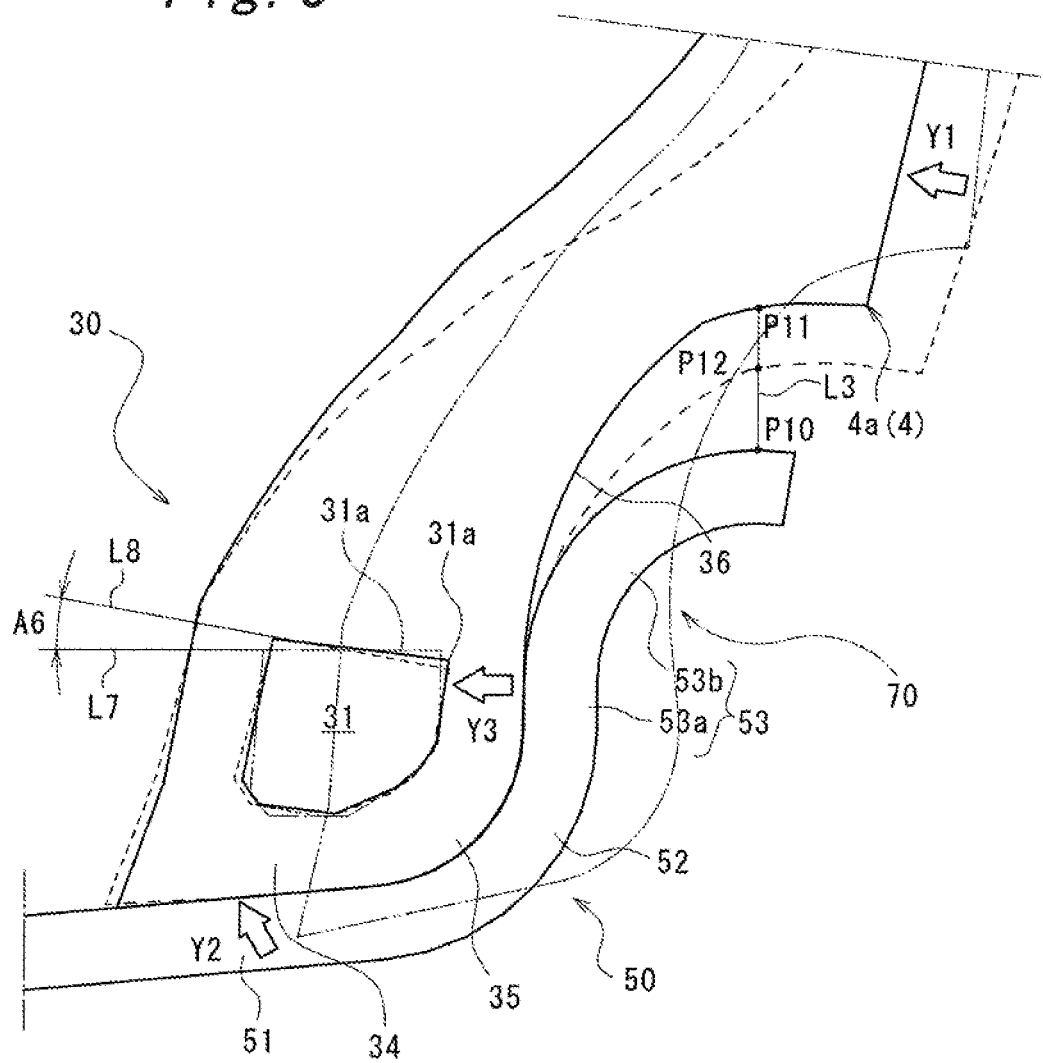
FIG. 3 is a meridian cross-sectional view of an area around the bead portion of the pneumatic tire in a rim-assembled state.

FIG. 3 illustrates an area around the bead portion when the pneumatic tire 1 is assembled on the corresponding regular rim 50 and inflated by being filled with the specified internal pressure, and the pneumatic tire 1 before being assembled is shown by the two-dot chain line, and the pneumatic tire 1 at the time of load input is also shown by the broken line. In the pneumatic tire 1, the outer width W1 between a pair of the bead portions 30 is formed to be wider than the rim width W0 of the corresponding regular rim 50. Therefore, in a case where the pneumatic tire 1 is assembled on the rim, the pair of the bead portions 30 need to be brought closer to each other inward in the tire width direction. At this time, the pneumatic tire 1 is brought to be deformed so that the sidewall 20 and the bead portion 30 are entirely inclined inward in the tire width direction toward the inner side in the tire radial direction over (arrow Y1 in the diagram).

Further, since the inclination angle A1 of the bead base 34 is larger than the inclination angle A0 of the rim seat 51, when the bead base 34 is fitted to the rim seat 51 in the tire radial direction, the bead base 34 rotates clockwise in FIG. 3 by an angle obtained by excluding an amount by which the bead base 34 is compressed from the angle difference between the inclination angles A0 and A1 (arrow Y2 in the diagram). The bead base 34 rotates so that the inclination angle A1 becomes smaller, and is fitted in the radial direction to the rim seat 51.

As a result, in the bead portion 30, with an area around the deepest portion 71 of the recess 70 as a bending starting point, a portion located on the inner side in the tire radial direction than the deepest portion 71 is inclined to rotate clockwise in FIG. 3 inward in the tire width direction as compared with the non-rim-assembled state (arrow Y3 in the diagram). As the bead base 34 rotates, the bead back surface 36 rotates inward in the tire width direction with an area around the deepest portion 71 as a bending starting point so that the inclination angle A2 becomes zero, that is, the straight segment 69 extends along the tire radial direction. In the present embodiment, the inclination angle A1 is 7° larger than the inclination angle A0. Accordingly, a portion located on the inner side in the tire radial direction than the deepest portion 71 rotates by an angle of 7° or less.

As a result, in the pneumatic tire 1, in the rim-assembled state, the recess 70 disappears and a portion located on the inner side in the tire radial direction than the deepest portion 71 of the bead back surface 36 deforms so as to extend substantially along the tire radial direction. Therefore, in the bead portion 30, the bead base 34, the bead heel 35, and a portion located on the inner diameter side than the deepest portion 71 of the bead back surface 36 are respectively in close contact with the rim seat 51, the rim heel 52, and the radial portion 53a of the rim flange 53 over substantially the entire surface.

From this non-rim-assembled state to the inflated state, the bead core 31 rotates clockwise in FIG. 3 in the same manner as the bead base 34 (arrow Y2 in the diagram). A rotation angle A6 of the bead core 31 substantially matches with the inclination angle A2 with respect to a straight line parallel to the tire radial direction. In the present embodiment, the rotation angle A6 of the bead core 31 is defined by an angle formed by an extension line L7 of the outer end surface 31a of the bead core 31 in the non-rim-assembled state and an extension line L8 of the outer end surface 31a of the bead core 31 in the inflated state.

In this rim-assembled state, the bead back surface 36 is formed so as to be sufficiently separated in the tire radial direction from the flange curved portion 53b. Specifically, the bead back surface 36 is formed so that the distance in the tire radial direction between an apex P10 located on the outermost side in the tire radial direction of the flange curved portion 53b and an intersection P11 of a radial straight line L3 extending in the tire radial direction through the apex P10 and the bead back surface 36 is 4 mm or more.

As shown by the broken line in FIG. 3, the bead back surface 36 is formed so as to be sufficiently separated in the tire radial direction from the flange curved portion 53b even in a state where the load corresponding to a load index set to the pneumatic tire 1 is input. Specifically, the bead back surface 36 is formed so that the distance in the tire radial direction between the apex P10 and the intersection P12 of the radial straight line L3 and the bead back surface 36 in the load input state is 3 mm or more.

Figure 4:
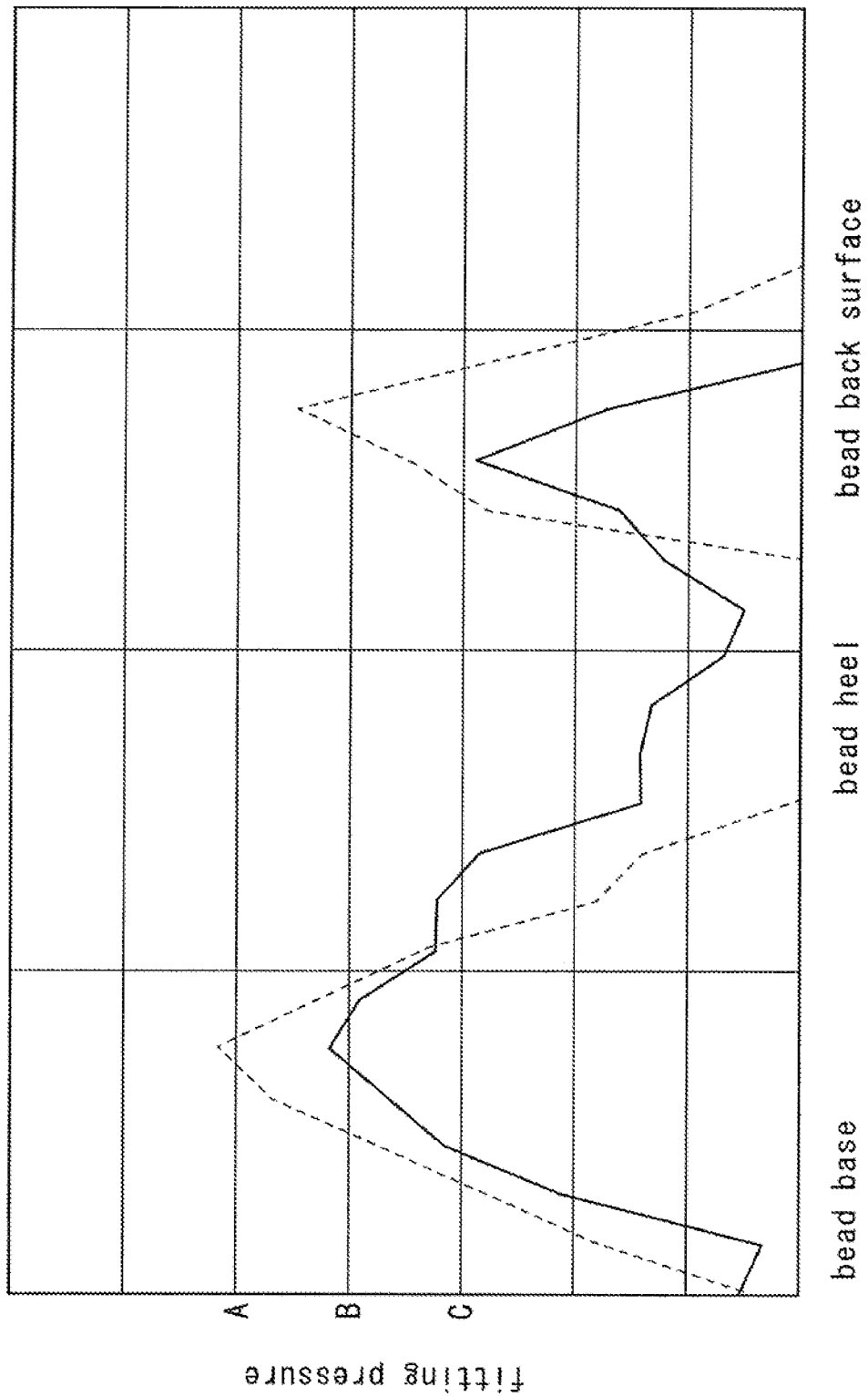
FIG. 4 is a graph showing fitting pressure on an outer surface of a bead portion during inflating.
Figure 8:
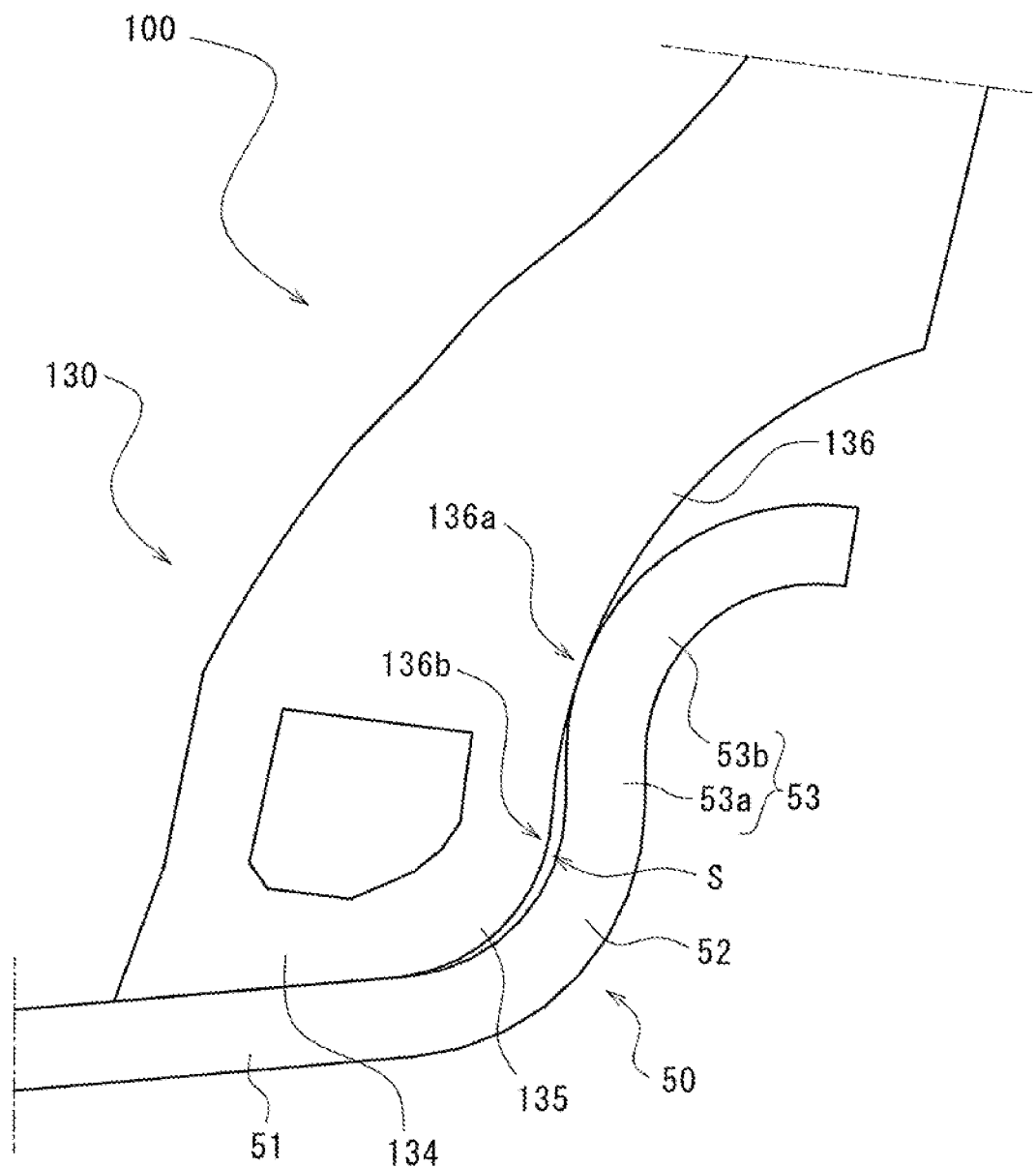
FIG. 8 is a meridian cross-sectional view of an area around the bead portion of the pneumatic tire according to a rim-assembled according to a conventional example.

FIG. 4 is a graph showing the fitting pressure in a fitting portion between the bead portion 30 and the regular rim 50 in a state where the pneumatic tire 1 is assembled on the regular rim 50 and inflated. The fitting pressure was measured by a sheet type pressure sensor sandwiched between the bead portion 30 and the regular rim 50. In this graph, the horizontal axis shows each position from an end on the inner side in the tire width direction of the bead base 34 to the bead back surface 36 along the outer surface of the bead portion 30, and the vertical axis shows the fitting pressure. Further, FIG. 4 also shows the fitting pressure of the bead portion 130 in a pneumatic tire 100 according to the conventional example of FIG. 8. The fitting pressure in the case of the pneumatic tire 1 is shown by a solid line, and the fitting pressure in the case of the pneumatic tire 100 is shown by a broken line.

As shown in FIG. 4, in the pneumatic tire 100 according to the conventional example, the fitting pressure is locally generated at two points including a bead base 134 and an abutting portion 136a located on the outer side in the tire radial direction of a bead back surface 136. The peak at the bead base 134 is generally fitting pressure A, and the peak at the abutting portion 136*a* is lower than the fitting pressure A and slightly exceeds fitting pressure B smaller than the fitting pressure A. That is, with reference to FIG. 8, the fitting pressure is not generated in a non-abutting portion 136*b* located between the bead base 134 and the bead back surface 136 and not abutting on the regular rim 50.

Therefore, the pneumatic tire 100 is locally strongly fitted at the two locations including the bead base 134 and the abutting portion 136*a*, and the bead portion 130 is strongly compressed at these two locations.

In contrast, in the pneumatic tire 1 according to the present embodiment, the fitting pressure is entirely generated between the bead base 34, the bead heel 35, and the bead back surface 36 and the regular rim 50. That is, unlike the pneumatic tire 100, the bead heel 35 and an inner diameter side portion of the bead back surface 36 also abut on the regular rim 50.

Specifically, in the pneumatic tire 1, the fitting pressure of a portion corresponding to a locally strongly fitted portion of the pneumatic tire 100 is lower than that of the pneumatic tire 100. That is, the peak at the bead base 34 is approximately the fitting pressure B, and the peak at the bead back surface 36 is slightly lower than fitting pressure C, which is smaller than the fitting pressure B. In contrast, in the pneumatic tire 1, the fitting pressure is generated in a portion corresponding to a non-fitting portion of the pneumatic tire 100. That is, the pneumatic tire 1 is in close contact with the regular rim 50 with the fitting pressure from the bead base 34 to the bead back surface 36, and thus local compression is suppressed.

Figure 5:
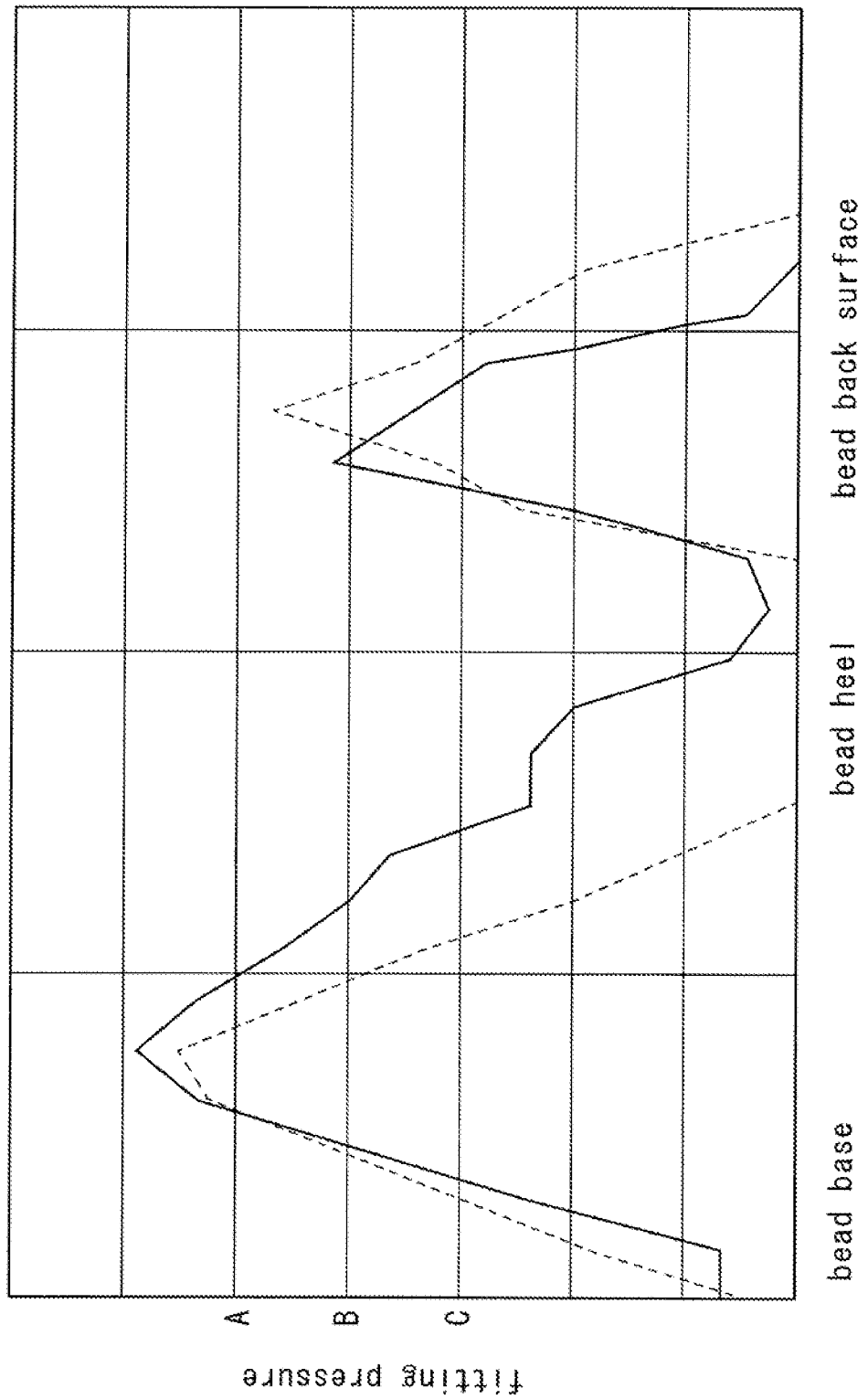
FIG. 5 is a graph showing fitting pressure on an outer surface of the bead portion under radial direction load.

FIG. 5 shows the fitting pressure on the outer surface of the bead portion 30 in a state where a load is applied in the tire radial direction from the state of FIG. 4. Like FIG. 4, the fitting pressure in the case of the pneumatic tire 1 is shown by a solid line, and the fitting pressure in the case of the pneumatic tire 100 is shown by a broken line. As shown in FIG. 5, since the pneumatic tire 100 of the conventional example is already strongly fitted at the bead base 134 and the abutting portion 136*a* of the bead back surface 136 in the inflated state, further compression is unlikely to be generated in these portions even in a state where the load is applied in the tire radial direction, and a room for increase of the fitting pressure is small.

In contrast, in the pneumatic tire 1 according to the present embodiment, the fitting pressure in the inflated state is lower than that in the pneumatic tire 100 of the conventional example. Accordingly, there is a room for increase margin of the fitting pressure in a state where a further load is applied. For this reason, as compared with the state of FIG. 4, the fitting pressure is increased as a whole. In the bead base 34, the fitting pressure is increased from the fitting pressure B to a level exceeding the fitting pressure A, and, in the bead back surface 36, the fitting pressure is increased from the fitting pressure C to the fitting pressure B.

Figure 6:
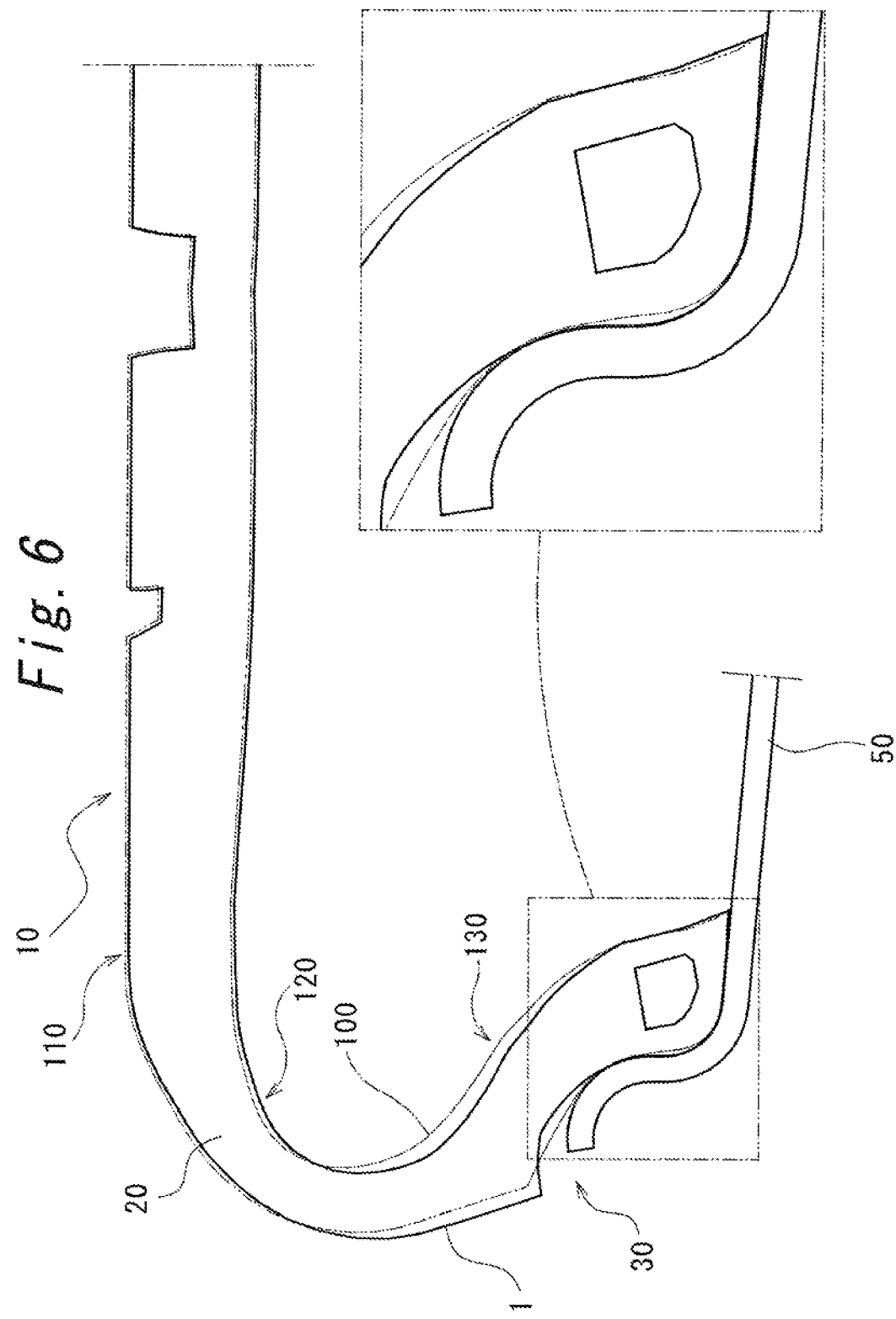
FIG. 6 is a meridian cross-sectional view illustrating deformation of the pneumatic tire of FIG. 5.

FIG. 6 is a cross-sectional view in the meridian direction illustrating a deformation of the pneumatic tires 1 and 100 in the state of FIG. 5. As shown in FIG. 6, in the pneumatic tire 100 according to the conventional example, the bead portion 130 side is unlikely to be compressed by a further load on the bead portion 130 in the inflated state. Accordingly, deformation occurs in a manner bent at a position close to the tread 110 of the sidewall 120.

In contrast, in the pneumatic tire 1 according to the present embodiment, since a margin for a further load on the bead portion 30 is larger than that in the pneumatic tire 100 in the inflated state, there is room for deformation in the bead portion 30 for a further load, and the sidewall 120 may be deformed so as to be bent as a whole from the tread 10 to the bead portion 30.

Figure 7:
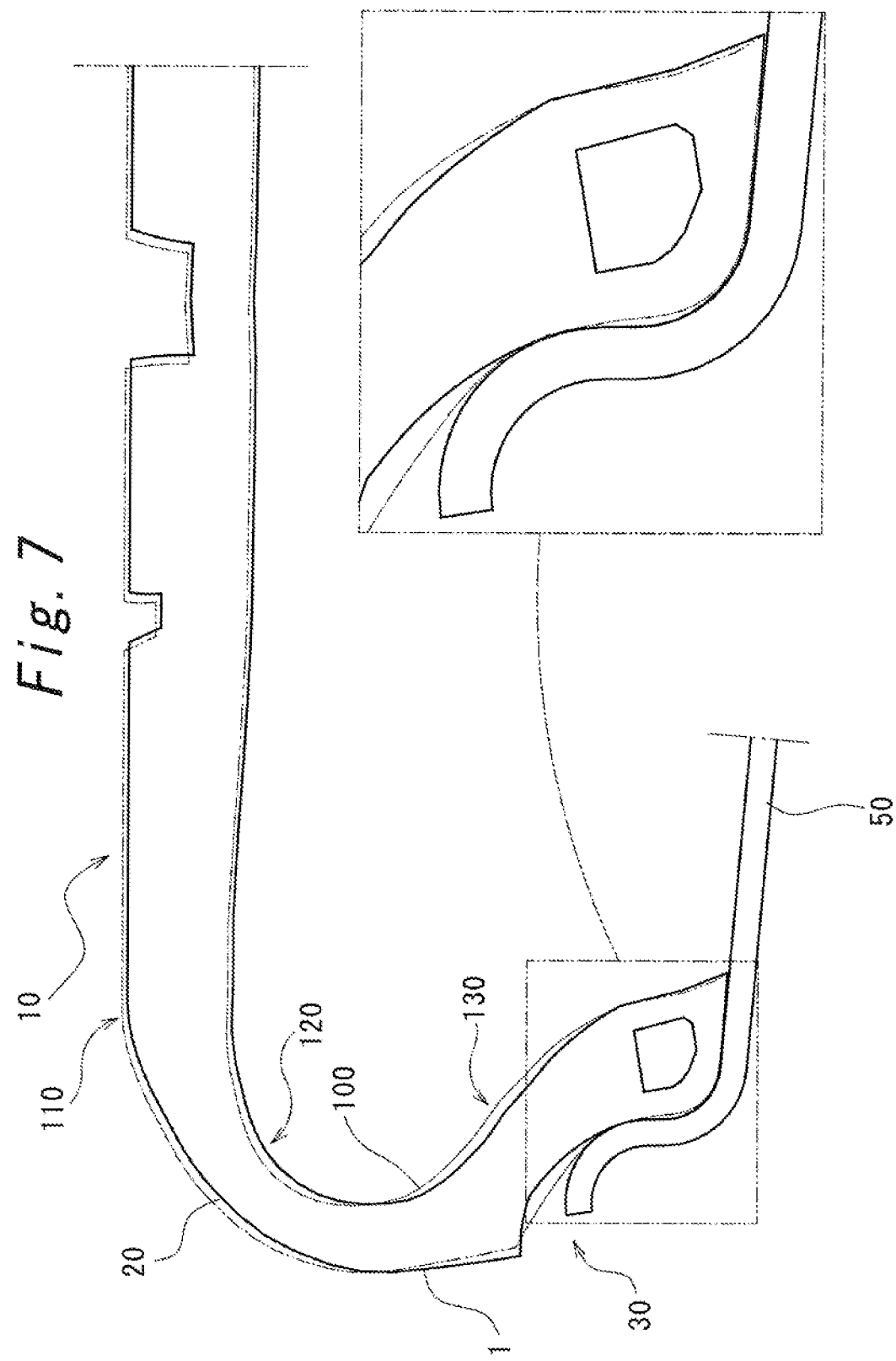
FIG. 7 is a meridian cross-sectional view illustrating deformation of the pneumatic tire of under lateral direction load.

FIG. 7 is a cross-sectional view in the meridian direction illustrating a state in which a load is applied in the tire width direction to the pneumatic tires 1 and 100 in the inflated state. As shown in FIG. 7, like FIG. 6, in the pneumatic tire 1, the sidewall 20 is deformed so as to be bent as a whole from the bead portion 30 to the tread 10, while in the pneumatic tire 100, the sidewall 120 is deformed so as to be bent at a position close to the tread 110. In the pneumatic tire 1, since the sidewall 20 is deformed so as to be bent as a whole, it is easy to increase an absorption amount of a load as compared with the pneumatic tire 100. As a result, the steering stability is improved.

According to the pneumatic tire 1 according to the present embodiment, effects described below are obtained.

(1) Since the recess 70 is formed on the bead back surface 36, an inner diameter side portion located on the inner diameter side from the deepest portion 71 of the recess 70 of the bead back surface 36 is inclined outward in the tire width direction toward the inner side in the tire radial direction in the non-rim-assembled state. In the rim-assembled state in which the pair of the bead portions 30 are brought closer to each other so that the width thereof equals the rim width W0 of the regular rim so, the inner diameter side portion is bent inward in the tire width direction from an area around the deepest portion 71 of the recess 70 as a bending starting point, and is likely to be arranged approximately along the tire radial direction. That is, in the rim-assembled state, the bead back surface 36 can be easily brought into close contact with substantially the entire surface of the radial portion 53*a* of the rim flange 53 while the recess 70 is made disappeared, and the contact area can be expanded.

In this way, in the no-load state where the rim is assembled, the surface pressure generates on substantially the entire surface of the bead back surface 36 that is in close contact with the radial portion 53*a* of the rim flange 53. Accordingly, as compared with the case where the surface pressure generates only on a part of the bead back surface 36, a load on the entire bead back surface 36 is distributed. That is, a sufficient compression margin for elastic deformation of the bead back surface 36 can be provided as compared with the case where a high surface pressure locally generates on the bead back surface 36.

Therefore, the bead back surface 36 can be further compressed as much as the sufficient compression margin at the time of radial load input and lateral force input. In this case, in the sidewall 20, a portion close to the bead portion 30 may also be deformed as the bead back surface 36 is further compressed. Accordingly, the sidewall 20 may be deformed so as to be as a whole bent from the bead portion 30 to the tread 10. Therefore, the load supportability on the sidewall 20 can be made more efficient, and the steering stability can be improved.

In particular, since the tire radial height H8 of the virtual intersection P8 is larger than 1.5 times and smaller than 3.0 times the tire radial height H10 of the deepest portion 71, it is easy to configure the second curved portion 62 to be large on the outer side in the tire radial direction. In this manner, the recess 70 can be easily configured to be large in the tire radial direction, and in the rim-assembled state, an inner diameter side portion located on the inner diameter side from the deepest portion 71 of the recess 70 can be more easily brought into close contact with substantially the entire surface of the radial portion 53*a* of the rim flange 53.

(2) If the depth D of the recess 70 is less than 1.0 mm, a portion located on the inner diameter side than the deepest portion 71, which is appropriately inclined outward in the tire width direction in the non-rim-assembled state, is bent inward in the tire width direction in the rim-assembled state so that the inclination is easily eliminated, and is just easily arranged along the radial portion 53a of the rim flange 53. If the depth of the recess is 1.0 mm or more, the portion located on the inner diameter side than the deepest portion 71 is likely to be excessively inclined outward in the tire width direction in the non-rim-assembled state, and, even if bent inward in the tire width direction in the rim-assembled state, the inclination outward in the tire width direction is unlikely to be eliminated. In this case, in the rim-assembled state, the recess 70 is unlikely to disappear, and the bead back surface 36 is unlikely to be caused to abut on substantially the entire radial portion 53a of the rim flange 53. Note that, if the depth D of the recess 70 is 0.8 mm or less, the portion located on the inner diameter side than the deepest portion 71, which is appropriately inclined outward in the tire width direction in the non-rim-assembled state, is more easily arranged along the radial portion 53a of the rim flange 53 in the rim-assembled state. Furthermore, if the depth D of the recess 70 is 0.3 mm or more and 0.5 mm or less, the portion located on the inner diameter side than the deepest portion 71, which is further appropriately inclined outward in the tire width direction in the non-rim-assembled state, is further easily arranged along the radial portion 53a of the rim flange 53 in the rim-assembled state.

(3) The tangent line 62b with respect to the second curved portion 62 (virtual curve 62a) extending from the virtual intersection P8 and the tangent line 63b with respect to the third curved portion 63 (virtual curve 63a) extending from the virtual intersection P8 intersect so as to project in a direction inclined outward in the tire radial direction toward the inner side in the tire width direction. In this manner, at the virtual intersection P8, as compared with a case where the tangent line 62b with respect to the second curved portion 62 and the tangent line 63b with respect to the third curved portion 63 intersect so as to project in a direction inclined inward in the tire radial direction toward the outer side in the tire width direction, it is easy to configure the second curved portion 62 to be large in the tire radial direction.

(4) Generally, the top 4a of the rim protector 4 is located in a manner corresponding to the outer diameter side of the outer diameter side end of the rim flange 53. Therefore, if the tire radial height H8 of the virtual intersection P8 is larger than 0.7 times and smaller than 1 time the tire radial height H6 of the rim protector 4, the virtual intersection P8 can be easily set in a manner sufficiently separated outward in the tire radial direction with respect to the radial portion 53a of the rim flange 53. In this manner, the second curved portion 62 can be easily configured to be large in the tire radial direction.

If the tire radial height H8 of the virtual intersection P8 is 0.7 times or less H6, it is difficult to set the virtual intersection P8 to be sufficiently separated outward in the tire radial direction with respect to the curved portion 53b of the rim flange 53, and it is difficult to configure the second curved portion 62 to be large in the tire radial direction. Further, if the tire radial height H8 of the virtual intersection P8 is 1 time or more H6, the third curved portion 63 extends in a direction inclined outward in the tire radial direction toward the inner side in the tire width direction. Therefore, thickness of the rim protector 4 tends to be insufficient, and the protection performance of the rim flange 53 by the rim protector 4 deteriorates.

(5) The radius R2 of curvature of the second curved portion 62, the radius R3 of curvature of the third curved portion 63, and the radius R4 of curvature of the fourth curved portion 64 satisfy R4<R2≤R3. In this manner, while preventing the inner end in the tire width direction of the third curved portion 63 from being configured inward in the tire radial direction, the fourth curved portion 64 is configured to be small. Accordingly, the second curved portion 62 can be easily configured to be large in the tire radial direction.

(6) With reference to the nominal rim diameter NR, the height H9 of the bead filler tip 32a is located at a position that is 1.1 times the height H8 of the virtual intersection P8. In other words, the bead filler 32, which is a rigid member, is located in a manner corresponding to a tire radial position of a portion where the virtual intersection P8 is located between the second curved portion 62 and the third curved portion 63 and that is likely to be a starting point of bending. As a result, bending deformation between the second curved portion 62 and the third curved portion 63 is suppressed, and the durability around the bead portion 30 is improved.

(7) Preferably, the height H9 of the bead filler tip 32a is 1.3 times or more the height H8 of the virtual intersection P8, and, as a result, the virtual intersection P8 is located so as to sufficiently avoid the tip 32a, which tends to have low rigidity, of the bead filler 32. That is, since a portion having higher rigidity of the bead filler 32 is located in a manner corresponding to the virtual intersection P8, the durability around the bead portion 30 is further improved.

It should be noted that the present invention is not limited to the configuration described in the above embodiment, and various modifications are possible.

In the above embodiment, the recess 70 is composed of at least a part of the first curved portion 61, the straight segment 69, and the second curved portion 62. However, the present invention is not limited to this. The first curved portion 61 and the second curved portion 62 may be configured to be directly connected to each other without using the straight segment 69. Further, in this case, the first curved portion 61 and the second curved portion 62 may be connected in a tangential continuous manner.

Further, in the present embodiment, the recess 70 is composed of an arc-shaped portion. However, the present invention is not limited to this. That is, the recess 70 may be formed in a trapezoidal shape or a triangular shape, and various configurations can be adopted. Note that, as in the present embodiment, if the recess 70 is configured in a continuous tangential manner and composed of an arc-shaped portion, the bead back surface 36 can be easily deformed smoothly so as to extend in a direction parallel to the tire radial direction at the time of rim assembly, and excellent rim fitting property is obtained.

First Embodiment

For the pneumatic tires of first and second comparative examples and first to third embodiments shown in Table 1, evaluation tests of the average fitting pressure in the bead back surface, bead durability, and steering stability as to the pneumatic tires and the regular rim were performed.

Between the pneumatic tires according to the first and second comparative examples and the first to third embodiments, the sizes of the radius R2 of curvature and the radius R3 of curvature and the height H10 of the deepest portion are different. For this reason, H8/H10, which is a ratio of the height of the virtual intersection H8 to the height H10 of the deepest portion, is different. In each of the pneumatic tires, the depth D of the deepest portion is common at 0.4 mm, and the radius R4 of curvature is common at 5 mm.

The first comparative example and the second comparative example are out of the range of 1.5<H8/H10<3.0 in which H8/H10 is within the numerical range of the present invention. Specifically, in the first comparative example, H8/H10 is 1.4, which is near the lower limit value of the above numerical range. In the second comparative example, H8/H10 is 3.14, which is near the upper limit value of the above numerical range. In the first to third embodiments, H8/H10 is within the numerical range of the present invention. Specifically, in the first embodiment, H8/H10 is 2.2, which is substantially the center of the above numerical range. In the second comparative example, H8/H10 is 1.7, which is near the lower limit value of the above numerical range. In the third comparative example, H8/H10 is 2.75, which is near the upper limit value of the above numerical range. The regular rim used for evaluation complies with the flange symbol J of the 5 degree drop center rim specified in JATMA.

For the average fitting pressure at the bead back surface 36, the average fitting pressure in the contact area of the bead back surface 36 with respect to the radial portion 53b of the rim flange 53 when inflated was measured, and the average fitting pressures of the second comparative example and the first to third embodiments are shown as an index, where the fitting pressure in the case of the first comparative example is set to 100. The higher the value, the stronger the fitting is in a narrower contact area, and the lower the value, the more the fitting pressure is distributed in a wider contact area.

For the evaluation of the bead durability, a drum durability test that induces a bead failure was performed, a running distance to a failure is measured, and the running distances of the second comparative example and the first to third embodiments are shown as an index, where the running distance in the case of the first comparative example is set to 100. The larger the value, the better the bead durability is.

For the evaluation of the steering stability, a sensory relative evaluation by the driver when the tire is mounted on a vehicle and the vehicle was actually driven was performed. With a maximum of 10 points, 6.0 is the central value, and the larger the value, the better the steering stability is.

TABLE 1

|  | First comparative example | Second comparative example | First embodiment | Second embodiment | Third embodiment |
| --- | --- | --- | --- | --- | --- |
| Radius R2 (mm) of curvature | 10 | 24 | 18 | 14 | 22 |
| Radius R3 (mm) of curvature | 14 | 26 | 22 | 18 | 24 |
| Radius R4 (mm) of curvature | 5 | 5 | 5 | 5 | 5 |
| Depth D (mm) of deepest portion | 0.4 | 0.4 | 0.4 | 0.4 | 0.4 |
| Height H8 (mm) of virtual intersection | 14 | 22 | 22 | 17 | 22 |
| Height H10 (mm) of deepest portion | 10 | 7 | 10 | 10 | 8 |
| H8/H10 | 1.4 | 3.14 | 2.2 | 1.7 | 2.75 |
| Intersection angle A3 (degree) at virtual intersection | 3 | 33 | 24 | 11 | 28 |
| Average fitting pressure on bead back surface | 100 | 104 | 82 | 91 | 93 |
| Bead durability | 100 | 95 | 110 | 105 | 105 |
| Steering stability | 6.0 | 6.0 | 7.0 | 6.5 | 6.5 |

As is clear from Table 1, in the pneumatic tires according to the first to third embodiments in which H8/H10 is larger than 1.5 and smaller than 3.0, the average fitting pressure on the bead back surface between the tire and the rim is reduced as compared with the first and second comparative examples, and thus the rim fitting property is excellent.

In particular, in the first embodiment, H8/H10 is substantially in the center of the above numerical range, the bead back surface 36 is easily arranged along the rim flange 53, and the bead durability and the steering stability are excellent. In contrast, in the second embodiment, the radius R2 of curvature is smaller than that in the first embodiment, and H8/H10 is near the lower limit value of the above numerical range. Accordingly, the average fitting pressure on the bead back surface with the rim flange 53 increases, and there is a small margin for improvement in the bead durability and the steering stability. Similarly, in the third embodiment, the radius R2 of curvature is larger than that in the first embodiment, and H8/H10 is near the upper limit value of the above numerical range. Accordingly, the average fitting pressure on the bead back surface with the rim flange 53 increases, and there is a small margin for improvement in the bead durability and the steering stability.

In the second comparative example, since the height H10 of the deepest portion 71 is lower than the height H11 of the radial portion 53a of the rim flange 53, which is 8 mm, it is difficult to arrange the bead back surface 36 along the rim flange 53. For this reason, the average fitting pressure between the tire and the rim increases, the local distortion on the bead back surface 36 becomes high, and the bead durability deteriorates.

Second Embodiment

For the pneumatic tires of third and fourth comparative examples and fourth and fifth embodiments shown in Table 2, evaluation tests of the bead durability and steering stability were performed.

Between the pneumatic tires according to the third and fourth comparative examples and the fourth and fifth embodiments, the shape of the outer surface of the bead back surface 36 is the same, the height H9 of the tip 32a of the bead filler 32 is different, and H9/H8, which is the ratio of the height H9 of the bead filler tip 32a to the height H8 of the virtual intersection P8, is different.

In the third and fourth comparative examples, H9/H8 is 1.05 and 0.95, respectively, and the virtual intersection P8 is located at substantially the same position as the bead filler tip 32a. In contrast, in the fourth embodiment, H9/H8 is 1.36, that is, 1.3 times or more as high, and the bead filler tip 32a is located to be separated outward in the tire radial direction from the virtual intersection P8 as compared with the third and fourth comparative examples. In the fifth embodiment, H9/H8 is 1.18, that is, 1.1 times or more as high, and, the bead filler tip 32a is separated outward in the tire radial direction from the virtual intersection P8 as compared with the third and fourth comparative examples, but is located on the inner side in the tire radial direction than that in the fourth embodiment. The regular rim used for evaluation complies with the flange symbol J of the 5 degree drop center rim specified in JATMA.

For the evaluation of the bead durability, a drum durability test that induces a bead failure was performed, a running distance to a failure is measured, and the running distance of the fourth comparative example and the fourth and fifth embodiments is shown as an index, where the running distance in the case of the third comparative example is set to 100. The larger the value, the better the bead durability is.

For the evaluation of the steering stability, a sensory relative evaluation by the driver when the tire is mounted on a vehicle and the vehicle was actually driven was performed. With a maximum of 10 points, 6.0 is the central value, and the larger the value, the better the steering stability is.

since the bead filler tip 32a is located on the inner diameter side in the tire radial direction than the virtual intersection P8, the bending rigidity around the virtual intersection P8 is likely to decrease as compared with the third comparative example, the bead durability is deteriorate, and the steering stability is deteriorated because of the lack of rigidity.

In the fourth embodiment, since the bead filler tip 32a is sufficiently higher than the virtual intersection P8, bending deformation is likely to occur around the thick portion of the bead filler 32 at the tire radial position corresponding to the virtual intersection P8, rigidity is improved, and both the bead durability and the steering stability are improved.

In contrast, in the fifth embodiment, the virtual intersection P8 is located at the tire radial position closer to the bead filler tip 32a than in the fourth embodiment. Accordingly, bending deformation is likely to occur around a portion where the bead filler 32 is thinner than that in the fourth embodiment at the tire radial position corresponding to the virtual intersection P8. For this reason, in the fifth embodiment, the margin for improvement in the bead durability and the steering stability is smaller than that in the fourth embodiment. However, sufficient improvement is observed as compared with the third and fourth comparative embodiments.

Third Embodiment

For the pneumatic tires of fifth and sixth comparative examples and sixth to ninth embodiments shown in Table 3, evaluation tests of the average fitting pressure in the bead back surface, bead durability, and steering stability as to the pneumatic tires and the regular rim were performed.

The fifth comparative example is the pneumatic tire 100 according to the conventional embodiment in which no recess is provided. In the sixth comparative example, the depth D of the recess 70 is 2 mm, which is 1 mm or more, and exceeds 1.0 mm or less, which is the upper limit of the present invention. In the sixth to ninth embodiments, the depth D of the recess 70 is within the above numerical range. In the eighth embodiment, the depth D of the recess 70 is 0.9 mm, which is near the upper limit within the above numeri-

TABLE 2

|  | Third comparative example | Fourth comparative example | Fourth embodiment | Fifth embodiment |
|---|---|---|---|---|
| Radius R2 of curvature (mm) | 18 | 18 | 18 | 18 |
| Radius R3 of curvature (mm) | 22 | 22 | 22 | 22 |
| Radius R4 of curvature (mm) | 5 | 5 | 5 | 5 |
| Depth D (mm) of deepest portion | 0.4 | 0.4 | 0.4 | 0.4 |
| Height H8 (mm) of virtual intersection | 22 | 22 | 22 | 22 |
| Height H9 (mm) of bead filler | 23 | 21 | 30 | 26 |
| H9/H8 | 1.05 | 0.95 | 1.36 | 1.18 |
| Bead durability | 100 | 90 | 130 | 120 |
| Steering stability | 6.0 | 5.5 | 6.75 | 6.5 |

As is clear from Table 2, in the third and fourth comparative examples, H9/H8 is less than 1.1 times, and the virtual intersection P8 and the bead filler tip 32a are located at substantially the same tire radial position. For this reason, distortion tends to concentrate during bending deformation in the bead portion 30. In the fourth comparative example, cal range. In the ninth embodiment, the depth D of the recess 70 is 0.8 mm, and is the upper limit value of 0.8 mm or less, which is a more preferable range in the above numerical range. In the sixth and seventh embodiments, the depth D of the recess 70 is 0.4 mm, and is the median value of 0.3 mm or more and 0.5 mm or less, which is a further preferable range in the above numerical range. The height H10 of the deepest portion 71 of the recess 70 is 10 mm and common in all of the sixth comparative example and the sixth to ninth embodiments. Regarding the radius R2 of curvature of the second curved portion 62, the fifth comparative example is 18 mm, the sixth comparative example is 12 mm, the sixth and ninth embodiments are 18 mm, and the seventh and eighth embodiments are 22 mm. The regular rim used for evaluation complies with the flange symbol J of the 5 degree drop center rim specified in JATMA.

For the average fitting pressure at the bead back surface 36, the average fitting pressure in the contact area of the bead back surface 36 with respect to the radial portion 53b of the rim flange 53 when inflated was measured, and the average fitting pressures of the sixth comparative example and the sixth to ninth embodiments are shown as an index, where the fitting pressure in the case of the fifth comparative example is set to 100. The higher the value, the stronger the fitting is in a narrower contact area, and the lower the value, the more the fitting pressure is distributed in a wider contact area.

For the evaluation of the bead durability, a drum durability test that induces a bead failure was performed, a running distance to a failure is measured, and the running distance of the sixth comparative example and the sixth to ninth embodiments is shown as an index, where the running distance in the case of the fifth comparative example is set to 100. The larger the value, the better the bead durability is.

For the evaluation of the steering stability, a sensory relative evaluation by the driver when the tire is mounted on a vehicle and the vehicle was actually driven was performed. With a maximum of 10 points, 6.0 is the central value, and the larger the value, the better the steering stability is.

local, it is considered that the average fitting pressure is higher than those in the sixth to ninth embodiments. Further, in the sixth comparative example, since the depth D of the deepest portion 71 is 2.0 mm and excessive, the adhesion to the rim is poor in the entire area and sufficient effect cannot be obtained, and a result similar to that in the fifth comparative example was obtained for the bead durability and the steering stability.

Regarding the sixth to ninth embodiments, the average fitting pressure at the bead back surface 36 decreases in the order of the eighth embodiment in which the depth D is near the upper limit within the above numerical range (less than 1.0 mm), the ninth embodiment in which the depth D is the upper limit value of the more preferable range (0.8 mm or less), and the sixth and seventh embodiments in which the depth D is the median value of the further preferable range (0.3 mm or more and 0.5 mm or less), and the bead durability and the steering stability are improved in this order. Specifically, in the sixth embodiment, since the depth D of the deepest portion of the recess 70 is 0.4 mm and appropriate, in the state where the rim is assembled and the tire is inflated, the recess 70 disappears and the bead portion 30 abuts on substantially the entire surface of the radial portion 53a of the rim flange 53 from the base portion 34 to the bead back surface 36. In this manner, the average fitting pressure at the bead back surface 36 was lower than that of the fifth comparative example, and as a result, the bead durability and steering stability were more excellent than those of the fifth comparative example.

Like the sixth embodiment, in the seventh embodiment as well, since the depth D of the deepest portion of the recess 70 is 0.4 mm and appropriate, in the state where the rim is

TABLE 3

| | Fifth comparative example | Sixth comparative example | Sixth embodiment | Seventh embodiment | Eighth embodiment | Ninth embodiment |
|---|---|---|---|---|---|---|
| Depth D (mm) of deepest portion | — | 2 | 0.4 | 0.4 | 0.9 | 0.8 |
| Height H10 (mm) of deepest portion | — | 10 | 10 | 10 | 10 | 10 |
| Radius of curvature (mm) of second curved portion | 18 | 12 | 18 | 22 | 22 | 18 |
| Average fitting pressure on bead back surface | 100 | 97 | 65 | 72 | 88 | 83 |
| Bead durability | 100 | 100 | 120 | 115 | 105 | 110 |
| Steering stability | 6.0 | 6.0 | 7.0 | 6.5 | 6.25 | 6.5 |

As is clear from Table 3, in the pneumatic tire according to the sixth to ninth embodiments in which the depth D of the deepest portion 71 of the recess 70 is less than 1.0 mm, the average fitting pressure of the bead back surface 36 is low as compared with the fifth and sixth comparative examples, and the fitting pressure is distributed over a wider contact area. This is because, in the sixth to ninth embodiments, since the depth D of the deepest portion 71 of the recess 70 is appropriate, the recess 70 is considered to disappear in the rim-assembled state, and the bead back surface 36 is easily arranged along the radial portion 53b of the rim flange 53.

In the sixth comparative example, since the depth D of the deepest portion 71 of the recess 70 is 1.0 mm or more, the recess 70 does not disappear even in a state where the rim is assembled and inflated, and the bead back surface 36 comes into local contact. Therefore, since the contact area is assembled and the tire is inflated, the recess 70 disappears and the bead portion 30 abuts on substantially the entire surface of the radial portion 53a of the rim flange 53 from the base portion 34 to the bead back surface 36. Note that, in the seventh embodiment, the margin for improvement is smaller than that in the sixth embodiment for both the bead durability and the steering stability. The reason for this is that in the seventh embodiment, the radius R2 of curvature of the second curved portion 62 is excessive as compared with the sixth embodiment, so that the virtual intersection P8 is likely to be located on the inner side in the tire width direction. As a result, the intersection angle A3 at the intersection P8 becomes large, and it is presumed that strain concentration is increased near the virtual intersection P8. In the eighth and ninth embodiments, to the same extent that the average fitting pressure at the bead back surface 36 was high as compared with those in the sixth and seventh embodiments, the bead durability and the steering stability were poor as compared with those in the sixth and seventh embodiments as a result. In the ninth embodiment, since the depth D of the recess 70 is in a more preferable range than that in the eighth embodiment, the average fitting pressure at the bead back surface 36 is lower than that in the eighth embodiment, and the bead durability and the steering stability are improved.

What is claimed is:

1. A pneumatic tire comprising:
a tread;
a pair of sidewalls extending inward in a tire radial direction from both ends in a tire width direction of the tread; and
a pair of bead portions that are continuous to the inner side in the tire radial direction of the pair of sidewalls and arranged at intervals wider than a regular rim width in a non-rim-assembled state, wherein
the bead portion includes
a rim protector that projects outward in the tire width direction,
a bead base that extends in the tire width direction in an inner end in the tire radial direction,
a bead heel that curves outward in the tire radial direction toward the outer side in the tire width direction from an outer end in the tire width direction of the bead base, and further curves inward in the tire width direction toward the outer side in the tire radial direction, and
a bead back surface extending outward in the tire radial direction from an outer end in the tire radial direction of the bead heel and continuous with the rim protector,
in the non-rim-assembled state, the bead back surface is formed with a recess that is recessed inward in the tire width direction than the outer end in the tire width direction of the bead heel,
the bead back surface includes
a recess R portion that has a center of curvature on the outer side in the tire width direction and at least a part constituting a deepest portion of the recess, and
an outer diameter side R portion that curves inward in the tire radial direction toward the inner side in the tire width direction from a top of the rim protector, and
when a tire radial height with reference to a nominal rim diameter of a corresponding regular rim of the deepest portion is H10, a tire radial height H8 with reference to the nominal rim diameter of a virtual intersection of a curve obtained by extending the recess R portion outward in the tire radial direction and a curve obtained by extending the outer diameter side R portion inward in the tire width direction is larger than 1.5 times H10 and smaller than 3.0 times H10.

2. The pneumatic tire according to claim 1, wherein the recess has a depth of less than 1.0 mm in the tire width direction.

3. The pneumatic tire according to claim 1, wherein a tangent line with respect to the recess R portion extending from the virtual intersection and a tangent line with respect to the outer diameter side R portion extending from the virtual intersection intersect so as to project in a direction inclined outward in the tire radial direction toward the inner side in the tire width direction.

4. The pneumatic tire according to claim 1, wherein when a tire radial height with reference to the nominal rim diameter of the top of the rim protector is H6, a tire radial height H8 of the virtual intersection is larger than 0.7 times H6 and smaller than 1 time H6.

5. The pneumatic tire according to claim 1, wherein
over the recess R portion and the outer diameter side R portion, a connection R portion that connects them in a tangential continuous manner is formed, and
when a radius of curvature of the recess R portion is R2, a radius of curvature of the outer diameter side R portion is R3, and a radius of curvature of the connection R portion is R4, the radii R2, R3, and R4 of curvature satisfy R4<R2≤R3.

6. The pneumatic tire according to claim 5, wherein the radius R3 of curvature is 1.2 times or more the radius R2 of curvature.

7. The pneumatic tire according to claim 1, wherein
the bead portion further includes
an annular bead core arranged in an end on the inner side in the tire radial direction, and
an annular bead filler that is connected to an outer peripheral surface of the bead core and has a cross-sectional shape in a meridian direction narrowing toward the outer side in the tire radial direction, and
with reference to the nominal rim diameter, a height of a tip of the bead filler is 1.1 times or more the tire radial height of the virtual intersection.

8. The pneumatic tire according to claim 7, wherein with reference to the nominal rim diameter, the height of the tip of the bead filler is 1.3 times or more the tire radial height of the virtual intersection.

* * * * *